United States Patent
Lee et al.

(10) Patent No.: US 9,787,455 B2
(45) Date of Patent: Oct. 10, 2017

(54) METHOD FOR OPERATION OF CANCELLING OR MITIGATING INTERFERENCE AND APPARATUS THEREFOR

(71) Applicant: LG ELECTRONICS INC., Seoul (KR)

(72) Inventors: Hyunho Lee, Seoul (KR); Hanjun Park, Seoul (KR); Inkwon Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 169 days.

(21) Appl. No.: 14/743,636

(22) Filed: Jun. 18, 2015

(65) Prior Publication Data

US 2015/0372796 A1 Dec. 24, 2015

Related U.S. Application Data

(60) Provisional application No. 61/014,645, filed on Jun. 19, 2014.

(51) Int. Cl.

| | |
|---|---|
| *H04L 5/00* | (2006.01) |
| *H04L 1/00* | (2006.01) |
| *H04W 48/00* | (2009.01) |
| *H04J 11/00* | (2006.01) |
| *H04L 27/26* | (2006.01) |

(52) U.S. Cl.
CPC .......... *H04L 5/0073* (2013.01); *H04J 11/005* (2013.01); *H04L 1/00* (2013.01); *H04L 5/0048* (2013.01); *H04L 5/0053* (2013.01); *H04L 27/2613* (2013.01); *H04W 48/00* (2013.01); *H04L 5/0023* (2013.01); *H04L 5/0032* (2013.01); *H04L 5/0051* (2013.01)

(58) Field of Classification Search
None
See application file for complete search history.

(56) References Cited

U.S. PATENT DOCUMENTS

| | | | |
|---|---|---|---|
| 2014/0036747 A1* | 2/2014 | Nory ................. | H04W 72/0406 370/311 |
| 2014/0092836 A1* | 4/2014 | Park ..................... | H04L 1/0038 370/329 |

(Continued)

*Primary Examiner* — Huy D Vu
*Assistant Examiner* — Bao G Nguyen
(74) *Attorney, Agent, or Firm* — Birch, Stewart, Kolasch & Birch, LLP

(57) ABSTRACT

The present invention relates to a wireless communication system and, more specifically, to a method for an operation of cancelling or mitigating interference, and an apparatus therefor. A method of cancelling or mitigating interference in a wireless communication system performed by a terminal includes receiving, from a serving cell, restricted configuration information of an enhanced physical downlink control channel (EPDCCH) which a dominant interference cell transmits, detecting the EPDCCH using the restricted configuration information of the EPDCCH, and performing an operation of cancelling or mitigating interference for the dominant interference cell using the detected EPDCCH, wherein the restricted configuration information of the EPDCCH includes a restricted set of parameters related to the EPDCCH configurable by the dominant interference cell.

14 Claims, 5 Drawing Sheets

(56) References Cited

U.S. PATENT DOCUMENTS

2014/0369437 A1* 12/2014 Horiuchi ............ H04B 7/0689
375/267
2015/0365154 A1* 12/2015 Davydov ............ H04B 7/024
370/329

* cited by examiner

METHOD FOR OPERATION OF CANCELLING OR MITIGATING INTERFERENCE AND APPARATUS THEREFOR

This application claims the benefit of U.S. Provisional Application No. 62/014,645, filed on Jun. 19, 2014, which is hereby incorporated by reference as if fully set forth herein.

BACKGROUND OF THE INVENTION

Field of the Invention

The present invention relates to a wireless communication system and, more specifically, to a method for an operation of cancelling or mitigating interference, and an apparatus therefor.

Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

The present invention relates to a method of cancelling or mitigating interference of a terminal. More specifically, the present invention relates to a method or an apparatus for cancelling or mitigating interference for a particular channel.

Technical problems to be solved by the present invention are not limited to the above-mentioned technical problems, and other technical problems not mentioned herein may be clearly understood by those skilled in the art from description below.

To achieve these objects and other advantages and in accordance with the purpose of the invention, as embodied and broadly described herein, a method of cancelling or mitigating interference in a wireless communication system performed by a terminal, includes receiving, from a serving cell, restricted configuration information of an enhanced physical downlink control channel (EPDCCH) which dominant interference cell transmits, detecting the EPDCCH using the restricted configuration information of the EPDCCH, and performing an operation of cancelling or mitigating interference for the dominant interference cell using the detected EPDCCH, wherein the restricted configuration information of the EPDCCH includes a restricted set of parameters related to the EPDCCH configurable by the dominant interference cell.

Additionally or alternatively, the restricted configuration information of the EPDCCH may be determined by the dominant interference cell in response to a request from the serving cell.

Additionally or alternatively, the parameters related to the EPDCCH may include information about a frequency or time resource region used for transmission of the EPDCCH.

Additionally or alternatively, the parameters related to the EPDCCH may include a demodulation reference signal (DMRS) scrambling sequence initialization value for each antenna port used for transmission of the EPDCCH.

Additionally or alternatively, the parameters related to the EPDCCH may include information about a type of the EPDCCH.

Additionally or alternatively, the type of the EPDCCH may be configured for each EPDCCH set.

Additionally or alternatively, the parameters related to the EPDCCH may include information about an aggregation level used for transmission of the EPDCCH.

Additionally or alternatively, the parameters related to the EPDCCH may include information about an antenna port used for transmission of the EPDCCH not distinguished by each terminal served by the serving cell.

Additionally or alternatively, the parameters related to the EPDCCH may include information about a mapping relation between an aggregation level and an antenna port used for transmission of the EPDCCH.

Additionally or alternatively, the restricted configuration information of the EPDCCH may be determined by the dominant interference cell in response to a request from the serving cell.

Additionally or alternatively, the parameters related to the EPDCCH may include information about a frequency or time resource region used for transmission of the EPDCCH.

Additionally or alternatively, the parameters related to the EPDCCH may include a demodulation reference signal (DMRS) scrambling sequence initialization value for each antenna port used for transmission of the EPDCCH.

Additionally or alternatively, the parameters related to the EPDCCH may include information about a type of the EPDCCH.

Additionally or alternatively, the type of the EPDCCH may be configured for each EPDCCH set.

Additionally or alternatively, the parameters related to the EPDCCH may include information about an aggregation level used for transmission of the EPDCCH.

Additionally or alternatively, the parameters related to the EPDCCH may include information about an antenna port used for transmission of the EPDCCH not distinguished by each terminal served by the serving cell.

Additionally or alternatively, the parameters related to the EPDCCH may include information about a mapping relation between an aggregation level and an antenna port used for transmission of the EPDCCH.

In another aspect of the present invention, a terminal includes a radio frequency (RF) unit, and a processor configured to control the RF unit, wherein the processor is configured to receive, from a serving cell, restricted configuration information of an EPDCCH which a dominant interference cell transmits, detect the EPDCCH using the restricted configuration information of the EPDCCH, and perform an operation of cancelling or mitigating interference for the dominant interference cell using the detected EPDCCH, wherein the restricted configuration information of the EPDCCH includes a restricted set of parameters related to the EPDCCH configurable by the dominant interference cell.

It should be noted that the above-mentioned technical solutions are merely a part of embodiments of the present invention, and various embodiments reflecting technical characteristics of the present invention may be derived and understood by those skilled in the art from detailed description of the present invention given below.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
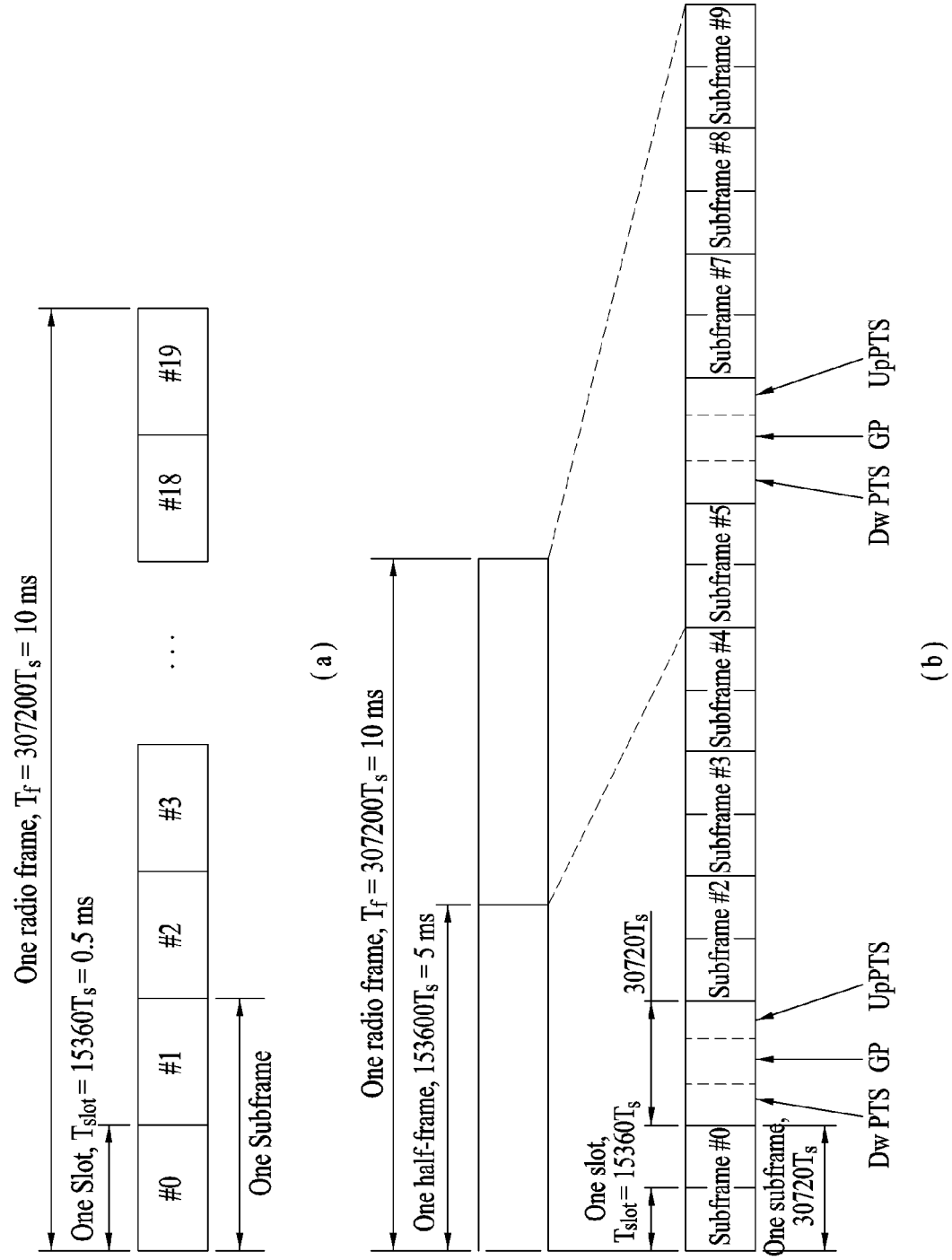
FIG. 1 is a diagram illustrating an example of a configuration of a radio frame used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_S$ | 2192 · $T_S$ | 2560 · $T_S$ | 7680 · $T_S$ | 2192 · $T_S$ | 2560 · $T_S$ |
| 1 | 19760 · $T_S$ | | | 20480 · $T_S$ | | |
| 2 | 21952 · $T_S$ | | | 23040 · $T_S$ | | |
| 3 | 24144 · $T_S$ | | | 25600 · $T_S$ | | |
| 4 | 26336 · $T_S$ | | | 7680 · $T_S$ | 4384 · $T_S$ | 5120 · $T_S$ |
| 5 | 6592 · $T_S$ | 4384 · $T_S$ | 5120 · $T_S$ | 20480 · $T_S$ | | |
| 6 | 19760 · $T_S$ | | | 23040 · $T_S$ | | |
| 7 | 21952 · $T_S$ | | | 12800 · $T_S$ | | |
| 8 | 24144 · $T_S$ | | | — | — | — |
| 9 | 13168 · $T_S$ | | | — | — | — |

Figure 2:
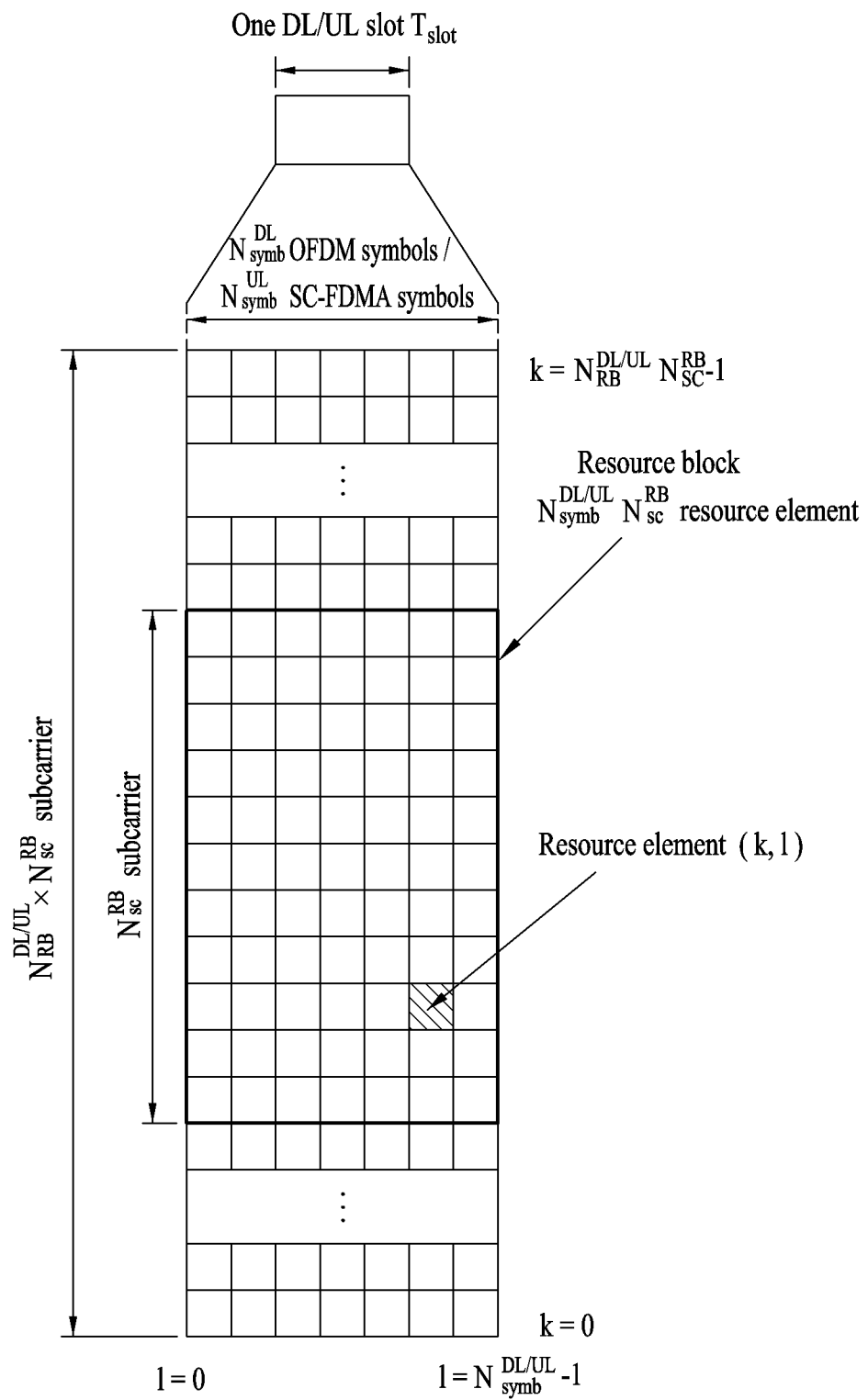
FIG. 2 is a diagram illustrating an example of a configuration of an uplink/downlink (DL/UL) slot in the wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
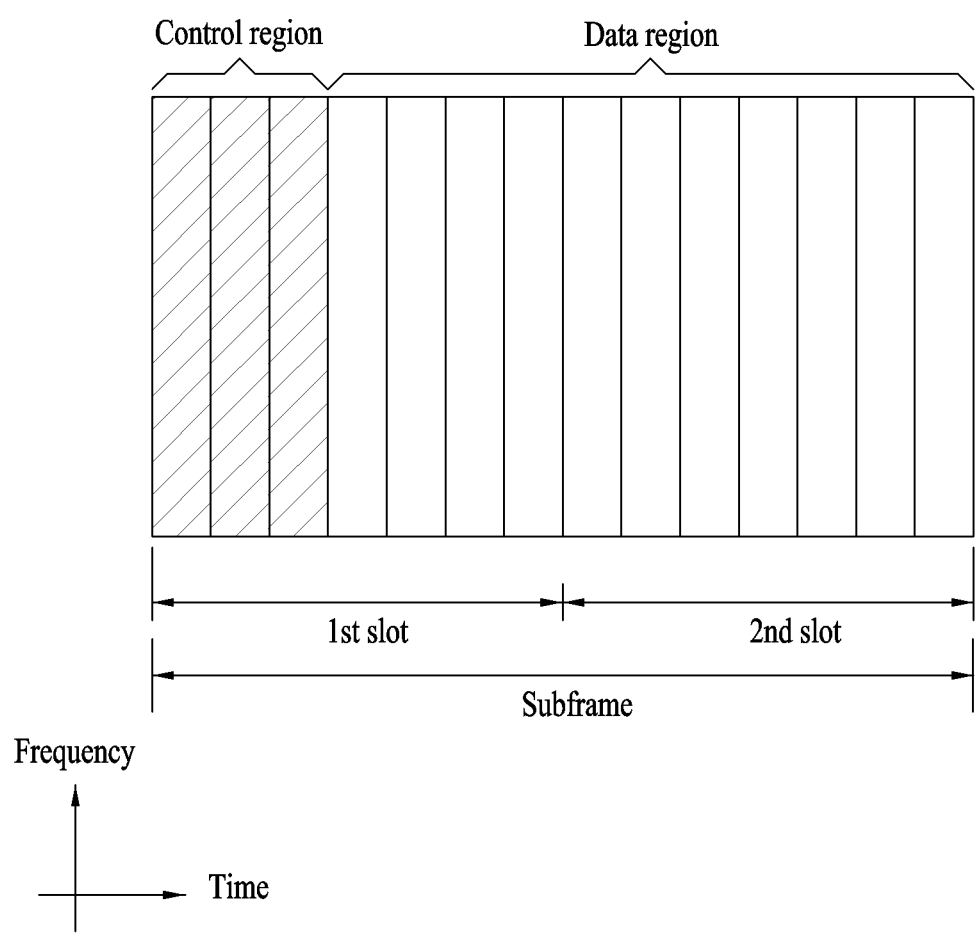
FIG. 3 is a diagram illustrating an example of a configuration of a DL subframe used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
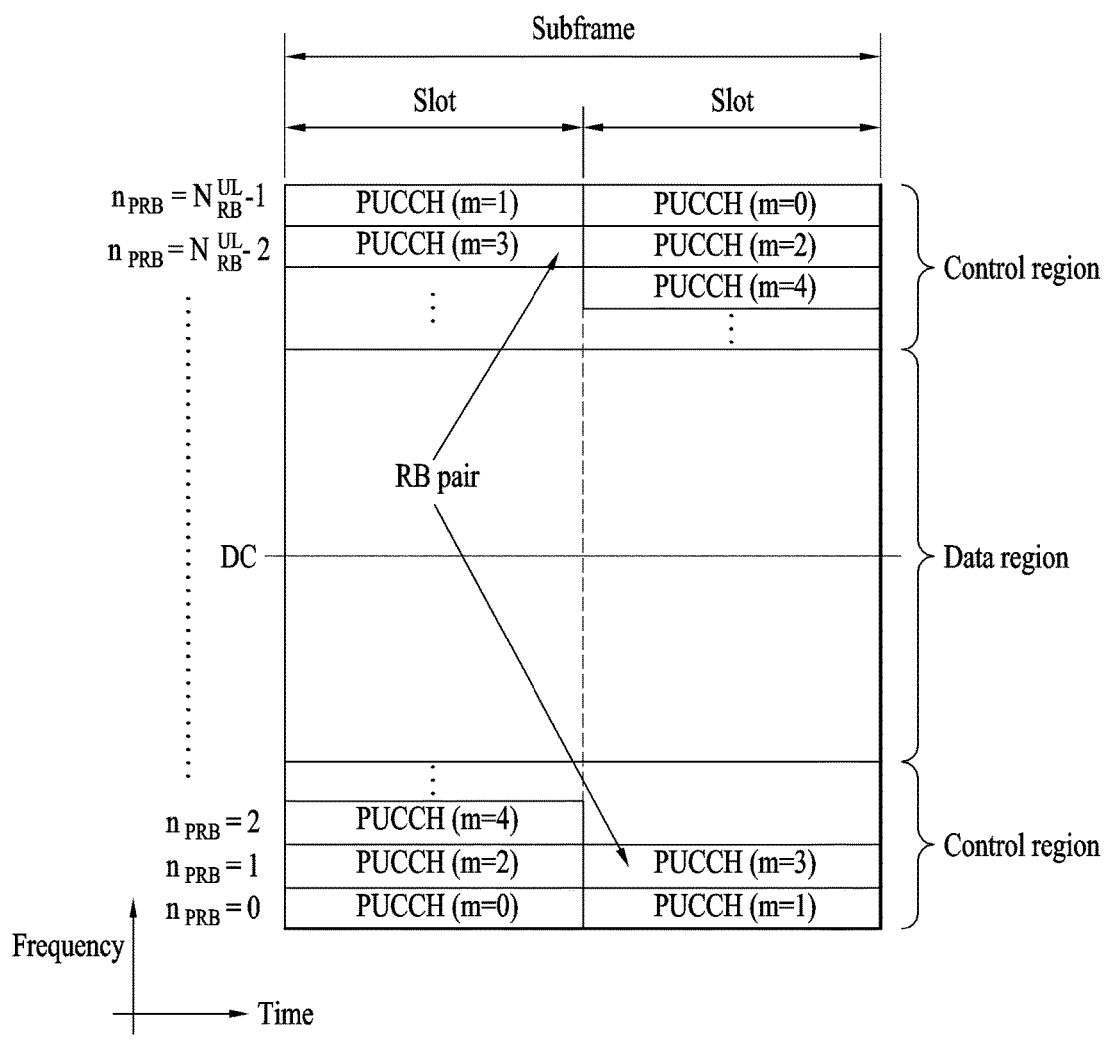
FIG. 4 is a diagram illustrating an example of a configuration of a UL subframe used in the 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CoMP (Coordinated Multiple Point Transmission and Reception)

In accordance with the improved system throughput requirements of the 3GPP LTE-A system, CoMP transmission/reception technology (also referred to as Co-MIMO, collaborative MIMO or network MIMO) has recently been proposed. The CoMP technology can increase throughput of a UE located at a cell edge and also increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the legacy LTE system, a method of enabling the UE located at the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNB) of a CoMP unit may use data. The CoMP unit refers to a set of eNBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by coordination of the cells of the CoMP unit, In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

In addition, one case in which there are multiple UL points (i.e., multiple Rx points) is referred to as UL CoMP, and the other case in which there are multiple DL points (i.e., multiple Tx points) is referred to as DL CoMP.

CSI-RS (Channel State Information-Reference Signal)

In 3GPP LTE(-A), the antenna port configured to transmit CSI-RS is referred to as a CSI-RS port, and the position of a resource contained in a predetermined resource region in which CSI-RS port(s) transmit(s) the corresponding CSI-RS(s) is referred to as a CSI-RS pattern or a CSI-RS resource configuration. In addition, time-frequency resources through which CSI-RS is allocated/transmitted are referred to as CSI-RS resources. For example, a resource element (RE) used for CSI-RS transmission is referred to as CSI-RS RE. Unlike CRS in which the RE position at which CRS per antenna port is transmitted is fixed, CSI-RS has a maximum of 32 different constructions so as to reduce inter-cell interference (ICI) under a multi-cell environment including a heterogeneous network environment. Different CSI-RS constructions are made according to the number of antenna ports contained in the cell, and contiguous cells may be configured to have different structures. Unlike CRS, CSI-RS may support a maximum of 8 antenna ports (p=15, p=15,16, p=15, . . . , 18, and p=15, . . . , 22), and CSI-RS may be defined only for $\Delta f=15$ kHz. The antenna ports (p=15, . . . , 22) may correspond to CSI-RS ports (p=0, . . . , 7), respectively.

CSI-RS configuration may be varies according to the number of CSI-RS ports configured. There are 20 CSI-RS configurations if 2 CSI-RS ports are configured, there are 10 CSI-RS configurations if 4 CSI-RS ports are configured, and there are 5 CSI-RS configurations if 8 CSI-RS ports are configured. Numbers may be assigned to respective CSI-RS configurations defined by the number of CSI-RS ports.

The CSI-RS structures have nested property. The nested property may indicate that a CSI-RS structure for a large number of CSI-RS ports is used as a super set of a CSI-RS structure for a small number of CSI-RS ports. For example, REs configured to construct CSI-RS structure #0 regarding 4 CSI-RS ports are contained in resources configured to construct CSI-RS structure #0 regarding 8 CSI-RS ports.

A plurality of CSI-RSs may be used in a given cell. In the case of non-zero power CSI-RS, only CSI-RS for one structure is transmitted. In the case of zero-power CSI-RS, CSI-RS of a plurality of structures can be transmitted. From among resources corresponding to the zero-power CSI-RS, the UE proposes zero transmit (Tx) power for resources other than resources to be proposed as non-zero power CSI-RS. For example, in the case of a radio frame for TDD, no CSI-RS is transmitted in any one of a special subframe in which DL transmission and UL transmission coexist, a subframe in which a paging message is transmitted, and a subframe in which transmission of a synchronous signal, physical broadcast channel (PBCH) or system information block type1 (SIB 1) collides with CSI-RS. The UE assumes that no CSI-RS is transmitted in the above subframes. Meanwhile, time-frequency resources used by the CSI-RS port for transmission of the corresponding CSI-RS are not used for PDSCH transmission, and are not used for CSI-RS transmission of other antenna ports instead of the corresponding CSI-RS port.

Time-frequency resources used for CSI-RS transmission are not used for data transmission, such that a data throughput is reduced in proportion to the increasing CSI-RS overhead. Considering this fact, CSI-RS is not constructed every subframe, and the CSI-RS is transmitted at intervals of a predetermined transmission period corresponding to a plurality of subframes. In this case, compared to the case in which CSI-RS is transmitted every subframe, the amount of CSI-RS transmission overhead can be greatly reduced. The above-mentioned subframe will hereinafter be referred to as a CSI-RS subframe configured for CSI-RS transmission.

A base station (BS) can inform a UE of the following parameters through higher layer signaling (e.g., MAC signaling, RRC signaling, etc.).

Number of CSI-RS ports
  CSI-RS structure
  CSI-RS subframe configuration $I_{CSI-RS}$
  CSI-RS subframe configuration period $T_{CSI-RS}$
  CSI-RS subframe offset $\Delta_{CSI-RS}$ If necessary, the BS (or eNB) may inform the UE of not only a CSI-RS configuration transmitted at zero power, but also a subframe used for transmission of the zero-power CSI-RS configuration.

CSI-IM (Interference Measurement)

For the 3GPP LTE Rel-11 UE, one or more CSI-IM resource structures may be configured. CSI-IM resource may be used to measure interference. The CSI-RS structure and the CSI-RS subframe structure (ICSI-RS) may be configured through higher layer signaling for each CSI-IM resource.

CSI Report

In a 3GPP LTE(-A) system, a user equipment (UE) reports channel state information (CSI) to a base station (BS) and CSI refers to information indicating quality of a radio channel (or a link) formed between the UE and an antenna port. For example, the CSI includes a rank indicator (RI), a precoding matrix indicator (PMI), a channel quality indicator (CQI), etc. Here, the RI indicates rank information of a channel and means the number of streams received by the UE via the same time-frequency resources. Since the value of the RI is determined depending on long term fading of the channel, the RI is fed from the UE back to the BS with periodicity longer than that of the PMI or the CQI. The PMI has a channel space property and indicates a precoding index preferred by the UE based on a metric such a signal to interference plus noise ratio (SINR). The CQI indicates the strength of the channel and means a reception SINR obtained when the BS uses the PMI.

Based on measurement of the radio channel, the UE may calculate a preferred PMI and RI, which may derive an optimal or best transfer rate when used by the BS, in a current channel state and feed the calculated PMI and RI back to the BS. The CQI refers to a modulation and coding scheme for providing acceptable packet error probability for the fed-back PMI/RI.

Recently, a network assisted interference cancelation and suppression (NAICS) scheme has been discussed as a scheme of mitigating inter-cell interference in a wireless communication system of a multi-cell environment including a plurality of cells (for example, a base station and an evolved Node B (eNB) or a transmission point (TP)). For example, a symbol-level interference cancelation (SLIC) technology has been discussed in current LTE-A standardization. In the technology, a UE removes a transmitted signal of an adjacent cell at a symbol level to mitigate an effect of a DL interference signal of the adjacent cell. The UE may receive data at a higher SINR by cancelled interference, which indicates that the UE may rapidly receive data at an enhanced transfer rate.

According to a current LTE standard, a serving cell uses a PDCCH for DL signal transmission. The PDCCH is used to transmit DL scheduling information (for example, resource allocation, a modulation and coding scheme (MCS), etc.) or UL scheduling grant. In this instance, each PDCCH delivers DL/UL data for a single UE (or group), that is, control information for a PDSCH and a PUSCH. The PDCCH performs transmission using a whole system band to obtain frequency diversity, and may only use a maximum of three (four in several cases) OFDM symbols.

However, when only the existing PDCCH is used, operations such as multi-user scheduling, frequency selective scheduling, and CoMP may not be supported. In this regard, in an LTE rel-11 standard, an enhanced physical downlink control channel (EPDCCH) corresponding to a new control channel has been introduced to solve the above-mentioned problem. The EPDCCH is transmitted in an existing PDSCH region, and has a characteristic in that beamforming gain or spatial diversity gain may be obtained according to transmission type. In addition, the EPDCCH carries control information, and thus requires high reliability when compared to data transmission. To this end, a concept such as aggregation level is used to reduce a coding rate.

When an adjacent cell performs scheduling for a UE having a configured EPDCCH, the EPDCCH is included in a portion of the PDSCH region. When the UE that cancels/mitigates interference does not have information about the EPDCCH transmitted from the adjacent cell, it is expected that the UE cancels/mitigates interference by recognizing the EPDCCH as the PDSCH. This may adversely affect performance.

Therefore, the present invention proposes that, when the UE can perform an NAICS operation of detecting and removing an adjacent cell interference signal with assistance from a network in the wireless communication system of the multi-cell environment including a plurality of cells (for example, an eNB or a TP), a configuration of a particular parameter be restricted in EPDCCH transmission of the adjacent cell, a serving cell provide the UE with information about the restriction, and the UE perform an operation using the information. Hereinafter, a specific operation of the present invention will be described using the LTE system as an example. However, applications of operations below can be extended to an arbitrary wireless communication system that includes a UE equipped with a high-performance receiver which has interference cancellation capabilities. In addition, in this specification, the UE that has the ability of performing the NAICS operation is referred to as an "NAICS UE". In addition, an adjacent cell corresponding to an object of the operation of cancelling/mitigating interference of NAICS is referred to as an "interference cell".

When the EPDCCH is configured, a cell provides a UE with parameters such as an EPDCCH start symbol, an EPDCCH set, the number of PRB pairs corresponding to an EPDCCH set, an EPDCCH type (localized/distributed), RB assignment, etc. using RRC signaling. In this instance, the information is configured independently of each EPDCCH-PRB-pair set.

EPDCCH-Config Information Element

TABLE 5

```
-- ASN1START
EPDCCH-Config-r11 ::=      SEQUENCE{
    config-r11      CHOICE {
        release                              NULL,
        setup                                SEQUENCE {
            subframePatternConfig-r11        CHOICE {
                release                          NULL,
                setup                            SEQUENCE {
                    subframePattern-r11              MeasSubframePattern-r10
                }
            }                                                                OPTIONAL,
-- Need ON
            startSymbol-r11                  INTEGER (1..4)                  OPTIONAL,
-- Need OP
            setConfigToReleaseList-r11       EPDCCH-SetConfigToReleaseList-r11 OPTIONAL,
-- Need ON
            setConfigToAddModList-r11        EPDCCH-SetConfigToAddModList-r11 OPTIONAL -
- Need ON
        }
    }
}
EPDCCH-SetConfigToAddModList-r11 ::=   SEQUENCE (SIZE(1..maxEPDCCH-Set-r11)) OF EPDCCH-
SetConfig-r11
EPDCCH-SetConfigToReleaseList-r11 ::=  SEQUENCE (SIZE(1..maxEPDCCH-Set-r11)) OF EPDCCH-
SetConfigId-r11
EPDCCH-SetConfig-r11 ::=    SEQUENCE {
    setConfigId-r11                 EPDCCH-SetConfigId-r11,
    transmissionType-r11            ENUMERATED {localised, distributed},
    resourceBlockAssignment-r11     SEQUENCE{
        numberPRB-Pairs-r11             ENUMERATED {n2, n4, n8},
        resourceBlockAssignment-r11     BIT STRING (SIZE(4..38))
    },
    dmrs-ScramblingSequenceInt-r11  INTEGER (0..503),
    pucch-ResourceStartOffset-r11   INTEGER (0..2047),
    re-MappingQCL-ConfigId-r11      PDSCH-RE-MappingQCL-ConfigId-r11  OPTIONAL, -- Need
OR
    ...
}
EPDCCH-SetConfigId-r11 ::= INTEGER (0..1)
-- ASN1STOP
```

TABLE 5

| EPDCCH-Config field descriptions |
|---|
| dmrs-ScramblingSequenceInt |
| The DMRS scrambling sequence initialization parameter $n_{ID,i}^{EPDCCH}$. EPDCCH-SetConfig |
| Provides EPDCCH configuration set. E-UTRAN configures at least one EPDCCH-SetConfig when EPDCCH-Config is configured. numberPRB-Pairs |
| Indicates the number of physical resource-block pairs used for the EPDCCH set. Value n2 corresponds to 2 physical resource-block pairs; n4 corresponds to 4 physical resource-block pairs and so on. Value n8 is not supported if dl-Bandwidth is set to 6 resource blocks. pucch-ResourceStartOffset |
| PUCCH format 1a and 1b resource starting offset for the EPDCCH set. re-MappingQCL-ConfigId |
| Indicates the starting OFDM symbol, the related rate matching parameters and quasi co-location assumption for EPDCCH when the UE is configured with tm10. This field provides the identity of a configured PDSCH-RE-MappingQCL-Config. E-UTRAN configures this field only when tm10 is configured. |

TABLE 5-continued

EPDCCH-Config field descriptions resourceBlockAssignment

Indicates the index to a specific combination of physical resource-block pair for EPDCCH set. The size of resourceBlockAssignment is based on numberPRB-Pairs and the signaled value of dl-Bandwidth.
setConfigId Indicates the identity of the EPDCCH configuration set.
startSymbol Indicates the OFDM starting symbol for any EPDCCH and PDSCH scheduled by EPDCCH on the same cell. If not present, the UE shall release the configuration and shall derive the starting OFDM symbol of EPDCCH and PDSCH scheduled by EPDCCH from PCFICH. Values 1, 2, and 3 are applicable for dl-Bandwidth greater than 10 resource blocks. Otherwise, values 2, 3, and 4 are applicable. E-UTRAN does not configure the field for UEs configured with tm10.
subframePatternConfig Configures the subframes which the UE shall monitor the UE-specific search space on EPDCCH, except for pre-defined rules. If the field is not configured when EPDCCH is configured, the UE shall monitor the UE-specific search space on EPDCCH in all subframes except for pre-defined rules.
transmission Type Indicates whether distributed or localized EPDCCH transmission mode is used.

According to an embodiment of the present invention, when a certain condition is satisfied, a serving cell of NAICS UEs may request that adjacent cells restrict a configuration of EPDCCH transmission. Here, the certain condition may refer to a case in which the number of NAICS UEs supported by the serving cell is greater than or equal to a certain number. Alternatively, when EPDCCH configuration information of the adjacent cells or restriction on the information is requested from an NAICS UE, the serving cell may request that the adjacent cells restrict a configuration of EPDCCH transmission. As another scheme, the serving cell may request that UEs report a result of measuring neighbor cells, and request that particular neighbor cell(s) restrict an EPDCCH configuration based on the reported measurement report. In addition, the serving cell may deliver a preferred EPDCCH configuration to an adjacent cell. For example, the serving cell may request a time/frequency resource region of an EPDCCH set, presence and absence of MU-MIMO in an EPDCCH region, etc. from the adjacent cell.

The adjacent cell may respond to the serving cell with information about restricting an EPDCCH configuration transmitted by the adjacent cell in a form of X2 signaling (or a new protocol form).

According to another embodiment of the present invention, an interference cell may perform transmission by restricting a frequency resource region of PRB pairs used for EPDCCH transmission to some of the PRB pairs in the whole system bandwidth, and a serving cell may provide corresponding information to an NAICS UE. For example, the NAICS UE may be provided with information indicating that the EPDCCH may be transmitted in PRB indices of 0 to 24 in a 50 RB system bandwidth and the EPDCCH may not be transmitted in PRB indices of 25 to 49.

More restrictively, the interference cell may transmit an EPDCCH to a plurality of UEs by restricting a frequency/time resource region used for EPDCCH transmission to a portion of a whole system bandwidth and subframe, and the serving cell may provide corresponding information to the NAICS UE.

The NAICS UE performs detection for each antenna port in a DMRS RE using a DMRS scrambling sequence parameter. For example, BD complexity of the UE may be reduced by performing detection for each PRB pair using $n_{ID}^{(i)}$ for a PDSCH-related DMRS and $n_{ID,i}^{EPDCCH}$ for an EPDCCH-related DMRS in a PRB pair indicating that the EPDCCH may be transmitted and by performing detection only using $n_{ID}^{(i)}$ for the PDSCH-related DMRS in a PRB pair indicating that the EPDCCH may not be transmitted. In a similar scheme, as proposed above, when the serving cell may verify whether MU-MIMO is present or absent in the EPDCCH region of the interference cell (or when the serving cell may know aggregation level restriction information to be proposed below), the serving cell may reduce BD complexity of the UE by signaling the NAICS UE to perform BD only using particular antenna port(s) in the corresponding region.

According to another embodiment of the present invention, the interference cell may perform transmission by restrictively using the DMRS scrambling sequence parameter which is restricted for each antenna part used for EPDCCH transmission, and the serving cell may provide corresponding information to the NAICS UE.

For example, BD complexity of the UE may be reduced using $n_{ID,0}^{EPDCCH}$ mapped to antenna ports 107 and 108 and using $n_{ID,1}^{EPDCCH}$ mapped to antenna ports 109 and 110.

According to another embodiment of the present invention, when the interference cell transmits an EPDCCH, the NAICS UE may presume that the interference cell uses only a localized-type EPDCCH, and the interference cell may restrictively operate such that only a localized type is actually used for the EPDCCH.

Alternatively, the serving cell may provide the NAICS UE with information about a type of an EPDCCH of the interference cell. In this case, the NAICS UE cancels/mitigates interference for a PRB pair corresponding to the localized-type EPDCCH, and does not attempt to cancel/mitigate interference for a PRB pair corresponding to a distributed-type EPDCCH.

The interference cell may configure an EPDCCH set by restricting a type for each EPDCCH set. For example, a first EPDCCH set may be restricted to a localized type, and a second EPDCCH set may be restricted to a distributed type.

The serving cell may provide the NAICS UE with configuration information for each EPDCCH set (for example, a PRB pair index (or a subset of used PRB pairs), EPDCCH start symbol information, subframe information, etc.). The NAICS UE may cancel/mitigate interference for the two types of EPDCCHs or for only the localized-type EPDCCH according to interference cancellation/mitigation performance of the UE.

According to another embodiment of the present invention, when an interference cell transmits an EPDCCH, it is proposed that a serving cell provide information about an EPDCCH start symbol of the interference cell to an NAICS UE. In other words, the serving cell may semi-statically (or dynamically) provide the NAICS UE with information about a starting symbol for EPDCCH transmission of the interference cell. For example, the information about the EPDCCH start symbol may have a form of "startsymbol" mentioned in the above Table 5.

Upon receiving, from the serving cell, information indicating that an OFDM symbol index of the EPDCCH start symbol of the interference cell is n, the NAICS UE may cancel/mitigate interference for PRB pairs used for EPDCCH transmission of the interference cell in OFDM symbols from n to $N_{symb}^{DL}$.

When the NAICS UE is not provided with information about the EPDCCH start symbol of the interference cell, the NAICS UE may perform BD of CFI of the interference cell and cancel/mitigate interference for PRB pairs used for EPDCCH transmission of the interference cell in OFDM symbols from the EPDCCH start symbol induced from the BD to $N_{symb}^{DL}$. Alternatively, when the NAICS UE is not provided with information about the EPDCCH start symbol of the interference cell, the NAICS UE may not cancel/mitigate interference for PRB pairs used for EPDCCH transmission of the interference cell in corresponding subframes.

According to another embodiment of the present invention, when the NAICS UE receives "network assisted information" that assists in an NAICS operation from a plurality of adjacent cells, and a dominant interference cell transmits an EPDCCH in a particular subframe, the NAICS UE first cancels/mitigates interference for an interference signal of a second dominant interference cell in the corresponding subframe. In other words, the NAICS UE does not cancel/mitigate interference for the EPDCCH.

Alternatively, when an order of priority for interference cancellation between interference cells is deduced through a particular criterion (for example, a difference in RSRP from the serving cell), interference is first cancelled/mitigated for an interference cell signal, which corresponds to a top priority, not transmitting the EPDCCH.

According to another embodiment of the present invention, when an interference cell transmits an EPDCCH, an NAICS UE may presume that the interference cell only uses an EPDCCH at a restricted aggregation level, and the interference cell may be operated to only use the EPDCCH at the restricted aggregation level.

For example, a minimum/maximum aggregation level used by the interference cell may be RRC-signaled, and the NAICE UE may perform BD on the assumption that the interference cell transmits an EPDCCH using an aggregation level greater/less than or equal to the minimum/maximum aggregation level.

Alternatively, the interference cell may be allowed to restrictively use some of aggregation levels among all aggregation levels when transmitting the EPDCCH, and the serving cell may provide the NAICS UE with restricted set information of the aggregation levels used in the interference cell in a bitmap. The NAICS UE may perform BD on the assumption that the interference cell uses one of aggregation levels in a restricted set of the aggregation levels when transmitting the EPDCCH.

According to a current LTE standard, an antenna port used for localized-type EPDCCH transmission is determined by a function of $N_{ECCE,low}$ corresponding to a lowest enhanced CCE (ECCE), a C-RNTI of the UE, an aggregation level, etc., which is defined as in the following Table 6.

TABLE 6

| | Normal cyclic prefix | | Extended |
|---|---|---|---|
| n' | Normal subframes, Special subframes, configurations 3, 4, 8 | Special subframes, configurations 1, 2, 6, 7, 9 | cyclic prefix Any subframe |
| 0 | 107 | 107 | 107 |
| 1 | 108 | 109 | 108 |
| 2 | 109 | — | — |
| 3 | 110 | — | — |

Here, n' is determined by the following Equation.

$$n'=n_{ECCE,low} \mod \min(N_{ECCE}^{EPDCCH},N_{ECCE}^{RB}) \quad N_{ECCE}^{RB}+n_{RNTI} \mod \quad \text{[Equation 1]}$$

$N_{ECCE}^{RB}$ denotes the number of ECCEs per PRB pair, and $N_{ECCE}^{EPDCCH}$ denotes the number of ECCEs per EPDCCH (that is an aggregation level of an EPDCCH).

In other words, in an EPDCCH including a plurality of ECCEs (for example, when an aggregation level is greater than or equal to 2), the antenna port used for EPDCCH transmission is determined by the C-RNTI of the UE such that MU-MIMO may be supported.

According to another embodiment of the present invention, it is proposed that the antenna port used for EPDCCH transmission of the interference cell be determined by the lowest ECCE index $n_{ECCE,low}$ and the aggregation level. For example, the antenna port for EPDCCH transmission may be determined by the following Equation.

$$n'=n_{ECCE,low} \mod N_{ECCE}^{RB}+\alpha_L \quad \text{[Equation 2]}$$

Here, $\alpha_L$ refers to an offset value which is preset according to an aggregation level L. As described above, when the antenna port for EPDCCH transmission is configured, the dependence of the antenna port for EPDCCH transmission on the UE C-RNTI disappears. Thus, the interference cell restrictively performs an MU-MIMO operation in which the same ECCE is used for two or more UEs and an EPDCCH distinguished by an antenna port is transmitted. Therefore, the NAICS UE may presume that at least MU-MIMO to which the same ECCE is applied is not performed for the EPDCCH of the interference cell. In this way, it can be effective in that BD complexity is reduced and interference is easily cancelled/mitigated.

According to another embodiment of the present invention, BD complexity for the EPDCCH may be further reduced by transmitting the EPDCCH using an antenna port determined according to an EPDCCH aggregation level for the EPDCCH of the interference cell. In this instance, the serving cell may provide the NAICS UE with mapping information between the antenna port and the aggregation level used by the interference cell using a semi-static signal such as an RRC signal. Alternatively, the serving cell may statically configure a mapping relation between the antenna port and the aggregation level such that the NAICS UE presumes that an interference EPDCCH is transmitted according to the mapping relation when "network assisted information" which assists in the NAICS operation is received.

For example, an example of a case in which an aggregation level used for EPDCCH transmission is restricted to 1, 2, 4 and 16, and an antenna port for EPDCCH transmission is restricted according to each aggregation level is as below.

TABLE 7

| Aggregation level | Antenna port for EPDCCH transmission |
|---|---|
| 1 | 107 |
| 2 | 108 |
| 4 | 109 |
| 16 | 110 |

As described above, when an antenna port for transmission is restricted according to an EPDCCH aggregation level, the NAICS UE may determine whether the EPDCCH of the interference cell is transmitted in a corresponding PRB pair by performing DMRS BD, thereby immediately determining a used aggregation level. As a result, it may be effective in that BD complexity of the NAICS UE is reduced and interference is easily cancelled/mitigated. More simply, when mapping between the aggregation level and the antenna port for transmission is configured as described above, and information about an aggregation level used by the interference cell is provided, the NAICS UE may perform BD for only one port.

In addition, antenna ports used when the interference cell transmits the EPDCCH are restricted to some particular antenna ports among four transmission antenna ports, and the serving cell may provide corresponding information to the NAICS UE. For example, when the interference cell restrictively transmits the EPDCCH only using transmission antenna ports 107 and 109, the NAICS UE may perform BD only for the two transmission antenna ports, thereby reducing complexity.

According to another embodiment of the present invention, when the interference cell transmits the EPDCCH, the number of EPDCCH sets may be restricted to 1 such that the adjacent cell easily performs an NAICS UE BD operation.

Figure 5:
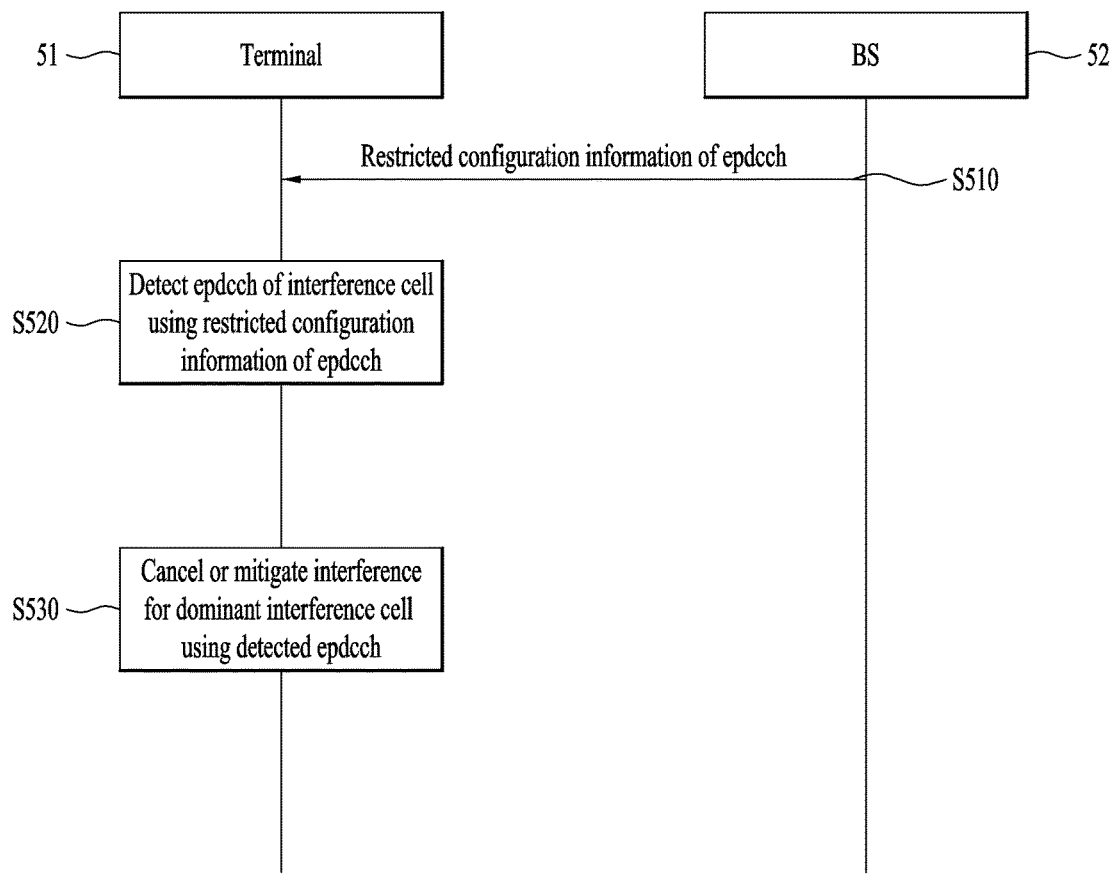
FIG. 5 is a diagram illustrating an operation according to an embodiment of the present invention.

FIG. 5 illustrates an operation according to an embodiment of the present invention.

In S510, a terminal 51 may receive restricted configuration information of an EPDCCH transmitted by a dominant interference cell from a serving cell or a serving base station.

The restricted configuration information of the EPDCCH may include a restricted set of parameters related to the EPDCCH that may be scheduled by the dominant interference cell.

In addition, the restricted configuration information of the EPDCCH may be determined by the dominant interference cell in response to a request from the serving cell. When the restricted configuration information of the EPDCCH is needed, the serving cell may request that the dominant interference cell restrict the EPDCCH, and thus receive the restricted configuration information of the EPDCCH from the dominant interference cell. For example, communication between the cells can be performed through an X2 interface.

Further, the parameters related to the EPDCCH may include information about a frequency or time resource region used for transmission of the EPDCCH.

Furthermore, the parameters related to the EPDCCH may include a DMRS scrambling sequence initialization value for each antenna port used for transmission of the EPDCCH.

In addition, the parameters related to the EPDCCH may include information about a type of the EPDCCH. The type of the EPDCCH may be configured for each EPDCCH set.

In addition, the parameters related to the EPDCCH may include information about an aggregation level used for transmission of the EPDCCH.

In addition, the parameters related to the EPDCCH may include information about an antenna port used for transmission of the EPDCCH which is not distinguished by each terminal served by the serving cell.

The parameters related to the EPDCCH may include information about a mapping relation between the aggregation level and the antenna port used for transmission of the EPDCCH.

In S520, the terminal may detect the EPDCCH using the restricted configuration information of the EPDCCH. In addition, in S530, the terminal may cancel or mitigate interference for the dominant interference cell using the detected EPDCCH, Additionally, the terminal may report channel state information reflecting the operation of cancelling or mitigating interference to the serving cell or the serving base station.

Description with reference to FIG. 5 or related to FIG. 5 corresponds to the operation of the terminal according to the present invention. The terminal, the cell, the base station, etc. according to the present invention may implement the embodiments of the present invention described above by combining at least two of the embodiments.

Figure 6:
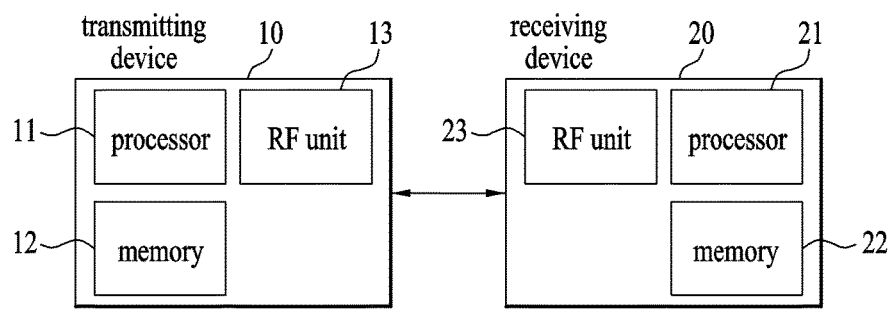
FIG. 6 is a block diagram illustrating an apparatus for implementing embodiment(s) of the present invention.

FIG. 6 is a block diagram of a transmitting device 10 and a receiving device 20 configured to implement exemplary embodiments of the present invention. Referring to FIG. 6, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The embodiments of the present application has been illustrated based on a wireless communication system, specifically 3GPP LTE (-A), however, the embodiments of the present application can be applied to any wireless communication system in which interferences exist.

According to the present invention, it is possible to perform an operation of cancelling or mitigating interference for a particular channel, and thus to expect improvement of system performance that reflects interference cancellation performance.

Effects that may be obtained from the present invention are not limited to the above-mentioned effects, and other effects not mentioned herein may be clearly understood by those skilled in the art from the above description.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of cancelling or mitigating interference in a wireless communication system, the method performed by a terminal and comprising:
   receiving, from a serving cell, restricted configuration information of an enhanced physical downlink control channel (EPDCCH) which is transmitted by a dominant interference cell, wherein the restricted configuration information of the EPDCCH is determined by the dominant interference cell in response to a request from the serving cell;
   detecting the EPDCCH using the restricted configuration information of the EPDCCH; and
   cancelling or mitigating interference for the dominant interference cell using the detected EPDCCH,
   wherein the restricted configuration information of the EPDCCH includes a restricted set of parameters related to the EPDCCH configurable by the dominant interference cell, and
   wherein the parameters related to the EPDCCH include information about an antenna port used for transmission of the EPDCCH, and the EPDCCH is not distinguished by each of terminals served by the dominant interference cell.

2. The method according to claim 1, wherein the parameters related to the EPDCCH include information about a frequency or time resource region used for transmission of the EPDCCH.

3. The method according to claim 1, wherein the parameters related to the EPDCCH include a demodulation reference signal (DMRS) scrambling sequence initialization value for each of antenna ports used for transmission of the EPDCCH.

4. The method according to claim 1, wherein the parameters related to the EPDCCH include information about a type of the EPDCCH.

5. The method according to claim 4, wherein the type of the EPDCCH is configured for each EPDCCH set.

6. The method according to claim 1, wherein the parameters related to the EPDCCH include information about an aggregation level used for transmission of the EPDCCH.

7. The method according to claim 1, wherein the parameters related to the EPDCCH include information about a mapping relation between an aggregation level and an antenna port used for transmission of the EPDCCH.

8. A terminal comprising:
   a radio frequency (RF) unit; and
   a processor configured to control the RF unit,
   wherein the processor is configured to:
     receive, from a serving cell, restricted configuration information of an enhanced physical downlink control channel (EPDCCH) which is transmitted by a dominant interference cell, detect the EPDCCH using the restricted configuration information of the EPDCCH, and cancel or mitigate interference for the dominant interference cell using the detected EPDCCH, wherein the restricted configuration information of the EPDCCH is determined by the dominant interference cell in response to a request from the serving cell, wherein the restricted configuration information of the EPDCCH includes a restricted set of parameters related to the EPDCCH configurable by the dominant interference cell, and wherein the parameters related to the EPDCCH include information about an antenna port used for transmission of the EPDCCH, and the EPDCCH is not distinguished by each of terminals served by the dominant interference cell.

9. The terminal according to claim 8, wherein the parameters related to the EPDCCH include information about a frequency or time resource region used for transmission of the EPDCCH.

10. The terminal according to claim 8, wherein the parameters related to the EPDCCH include a demodulation reference signal (DMRS) scrambling sequence initialization value for each of antenna ports used for transmission of the EPDCCH.

11. The terminal according to claim 8, wherein the parameters related to the EPDCCH include information about a type of the EPDCCH.

12. The terminal according to claim 11, wherein the type of the EPDCCH is configured for each EPDCCH set.

13. The terminal according to claim 8, wherein the parameters related to the EPDCCH include information about an aggregation level used for transmission of the EPDCCH.

14. The terminal according to claim 8, wherein the parameters related to the EPDCCH include information about a mapping relation between an aggregation level and an antenna port used for transmission of the EPDCCH.

* * * * *